United States Patent [19]

Shimomura et al.

[11] Patent Number: 5,050,428

[45] Date of Patent: Sep. 24, 1991

[54] APPARATUS FOR MEASURING AIR FLOW INTAKE OF INTERNAL COMBUSTION ENGINE

[75] Inventors: Setsuhiro Shimomura; Toshiro Hara; Masanori Inada; Sakae Kiguchi, all of Hyogo, Japan

[73] Assignee: Mitsubishi Denki K.K., Tokyo, Japan

[21] Appl. No.: 672,784

[22] Filed: Mar. 21, 1991

Related U.S. Application Data

[63] Continuation of Ser. No. 425,147, Oct. 23, 1989, abandoned.

[30] Foreign Application Priority Data

Nov. 9, 1988 [JP] Japan ............................... 63-284436

[51] Int. Cl.$^5$ .............................................. G01F 1/68
[52] U.S. Cl. ................................. 73/118.2; 73/204.18
[58] Field of Search ............. 73/118.2, 204.11, 204.15, 73/204.18, 204.19, 861.77, 861.78, 861.22, 861.24

[56] References Cited

U.S. PATENT DOCUMENTS

| | | | |
|---|---|---|---|
| 4,080,821 | 3/1978 | Johnston | 73/204.15 X |
| 4,084,155 | 4/1978 | Herzl et al. | 73/861.24 X |
| 4,134,297 | 1/1979 | Herzl | 73/861.24 |
| 4,590,805 | 5/1986 | Baird et al. | 73/861.77 X |
| 4,685,331 | 8/1987 | Renken et al. | 73/204.15 |
| 4,860,583 | 8/1989 | Olson | 73/204.18 X |

FOREIGN PATENT DOCUMENTS 153711  7/1987  Japan .

*Primary Examiner*—Herbert Goldstein
*Attorney, Agent, or Firm*—Sughrue, Mion, Zinn, Macpeak & Seas

[57] ABSTRACT

An apparatus for measuring an air flow intake of an internal combustion engine which comprises an air flow sensor for measuring the level of the air flow intake and an interface circuit for receiving an output signal from the sensor. The air flow sensor includes a current output circuit which outputs a current corresponding to the level of the air flow intake as the output signal of the sensor, and the interface circuit includes a current to voltage converter which converts the current from the sensor into a voltage signal and outputs it to an A/D converter included in a fuel injection unit.

14 Claims, 3 Drawing Sheets

APPARATUS FOR MEASURING AIR FLOW INTAKE OF INTERNAL COMBUSTION ENGINE

This is a continuation of application Ser. No. 07/425,147 filed Oct. 23, 1989 now abandoned.

BACKGROUND OF THE INVENTION

1. Field of the Invention

This invention relates to an apparatus for measuring an air flow intake of an internal combustion engine, and more particularly is directed to an apparatus including an air flow sensor for measuring the level of the air flow intake of an internal combustion engine and an interface circuit for receiving an output signal from this sensor.

2. Description of the Prior Art

As is widely known, an air flow sensor for measuring the air flow intake of an internal combustion engine may include a hot wire type air flow sensor. The hot wire type air flow sensor acts to output a voltage signal corresponding to the amount of air passing through the sensor. An input processing circuit receives the voltage signal output from the sensor and such a processing circuit subsequently processes and transmits the received signal to an analog-to-digital conversion IC. A fuel injection control unit incorporating such an input processing circuit judges the amount of air flow sucked in by the internal combustion engine and sprays an amount of fuel corresponding to the amount of air flow.

FIG. 1 illustrates a conventional hot wire type air flow sensor 1, and FIG. 2 shows a combination of the air flow sensor 1 shown in FIG. 1 and a fuel injection unit 2 including an input processing circuit 2a according to the prior art.

In FIG. 1, symbol $R_H$ designates a hot wire (heating resistor), $R_K$ a thermistor for sensing the temperature of the air flow in an internal combustion engine, $R_A$ and $R_B$ reference resistors, $1a$ an amplifier, $1d$ a differential amplifier and $1e$ a transistor. In the conventional air flow sensor, a current $I_H$ flows in the hot wire $R_H$ under the control of a feed back loop comprising the differential amplifier $1d$ and the transistor $1e$, and corresponds to the level of the air flow to keep the temperature of the hot wire $R_H$ constant. Therefore, it is possible to detect the level of air flow intake from the current $I_H$, and an output voltage $V_{AFS}(=A \cdot I_H \cdot R_B$; A: a gain of the amplifier $1a$) corresponds to the level of air flow. The fundamental constitution and operation of such a conventional air flow sensor are described in Japanese Patent Public Disclosure No. 76182/79.

Turning to FIG. 2, the input processing circuit $2a$ in the fuel injection unit 2 is connected to the air flow sensor 1 which is constructed as shown in FIG. 1 and includes an operational amplifier $2a_1$. The output voltage $V_{AFS}$ from the amplifier $1a$ is applied to a non-inverting input terminal (positive input terminal) of the operational amplifier $2a_1$.

This amplifier $2a_1$ is adapted to amplify an input voltage $V_{IN}$ and to generate an output voltage $V_o$ to an analog to digital converter (converter) not shown in FIG. 2. An inverting input terminal (negative input terminal) of the amplifier $2a_1$ is grounded via a resistor $R_{12}$, and a resistor $R_{11}$ is connected between an output terminal and the negative input terminal thereof.

The input processing circuit $2a$ functions to process the output voltage $V_{AFS}$ from the amplifier $1a$ and transmits the processed voltage to the A/D converter. The processed, or output voltage $V_o$ of the circuit $2a$ can be represented by the following equation:

$$V_o = V_{IN} \times (R_{11} + R_{12})/R_{12}$$

Note that numeral 3 shown in these drawings designates a battery for supplying electrical power to the fuel injection unit 2 as well as to the air flow sensor 1.

In the apparatus shown in FIG. 2, the amplifier $1a$ incorporated in the air flow sensor outputs the voltage $V_{AFS}$ on the basis of the potential at a reference point $A_1$ in the sensor 1. The potential at the reference point $A_1$ is a positive potential $V_1$ but not a ground potential at the earth point $E_1$ when the sensor 1 is energized. That is because a line $l_1$ connected between the points $A_1$ and $E_1$ has a resistance, even though the value thereof is small, whereby a voltage drop is caused on the line $l_1$ when a current $I_1$ flows from the sensor to the ground point $E_1$ through the line $l_1$.

Similarly, in the fuel injection unit 2, a reference point $A_2$ has a positive potential $V_2$ on the basis of a ground point $E_2$, which is equal to the voltage drop between the reference point $A_2$ and the ground point $E_2$ and is caused by a resistance of a line $l_2$ connected between the points $A_2$ and $E_2$ and a current $I_2$ therethrough.

Furthermore, since the current $I_2$ is run to the battery 3, a potential difference $V_{12}$ is caused between the ground points $E_1$ and $E_2$.

Hence, the voltage $V_{IN}$ input to the input processing circuit $2a$, which is based on the reference point $A_2$, is expressed such as:

$$V_{IN} = V_{AFS} - (V_2 + V_{12} - V_1)$$

$$\therefore V_{AFS} - V_1 = V_{IN} - (V_2 + V_{12})$$

It follows from this formula that an input error represented by $(V_2 + V_{12} - V_1)$ is given to the operational amplifier $2a_1$. Accordingly, the output voltage $V_o$ includes the above error and the error is also transmitted to the A/D converter, thereby the fuel injection unit 2 comes to have an error in fuel injection quantity, which responds to the input error $(V_2 + V_{12} - V_1)$.

SUMMARY OF THE INVENTION

It is a primary object of the present invention, which is devised to obviate the foregoing problems, to provide an apparatus for measuring the air flow intake of an internal combustion engine including an air flow sensor and an input processing circuit for receiving and processing an output from the sensor which lessens the influence of errors due to the circuit consumption of current by the air flow sensor, and a consumption current by a unit circuit incorporating the input processing circuit, as well as a difference in potential between the ground points of the sensor and the unit circuit.

This object is achieved by an apparatus for measuring the air flow intake of an internal combustion engine which includes means for converting the output of the air flow sensor into a current signal and transmitting the current signal, and means for receiving the current signal and converting the current signal into a voltage signal, and means for converting the voltage signal into a digital signal.

According to the present invention, an intake air flow signal is transmitted in the form of a current signal, and hence the intake air flow signal is accurately propagated even when fluctuations are caused in electric ground potentials of the air flow sensor and the unit circuit.

BRIEF DESCRIPTION OF THE DRAWINGS

Other objects and advantages of the invention will become apparent during the following discussion taken in conjunction with the accompanying drawings, in which.

DESCRIPTION OF THE PREFERRED EMBODIMENT

Figure 1:
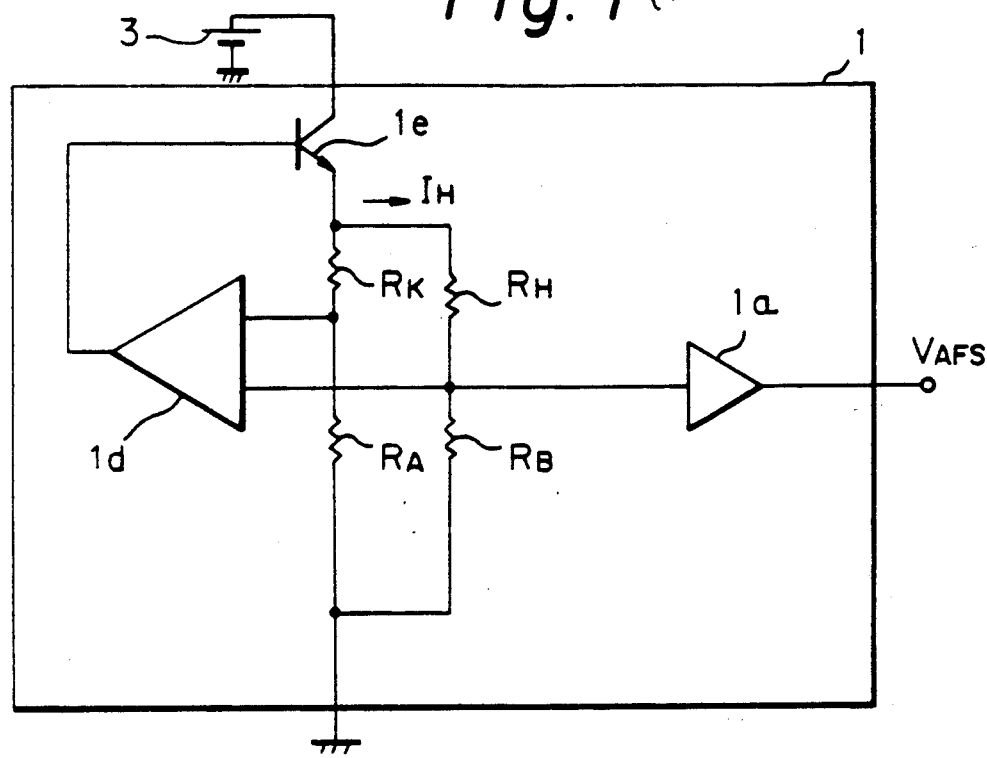
FIG. 1 is a circuit diagram showing a conventional hot wire type air flow sensor.
Figure 2:
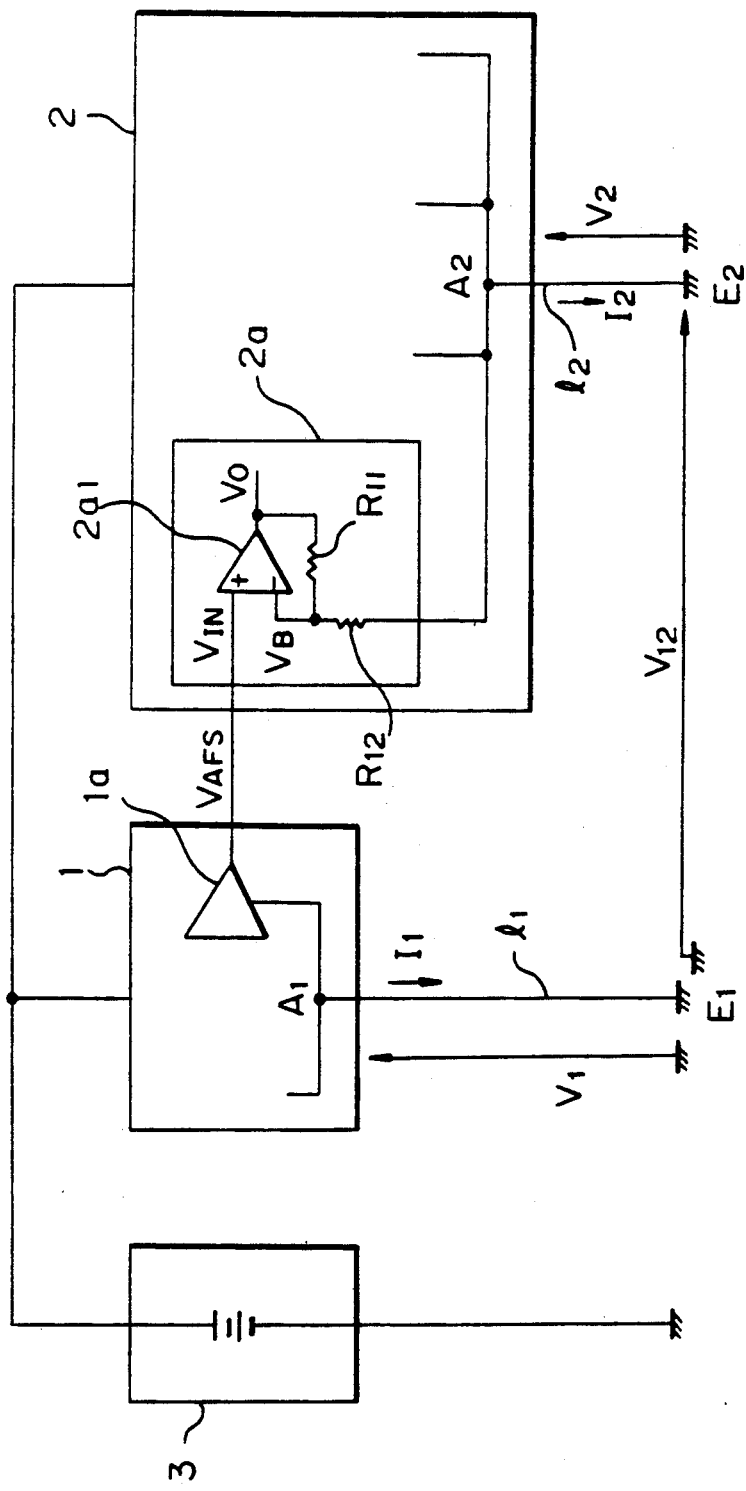
FIG. 2 is a block diagram illustrating a prior art apparatus for measuring an intake air flow of an internal combustion engine.
Figure 3:
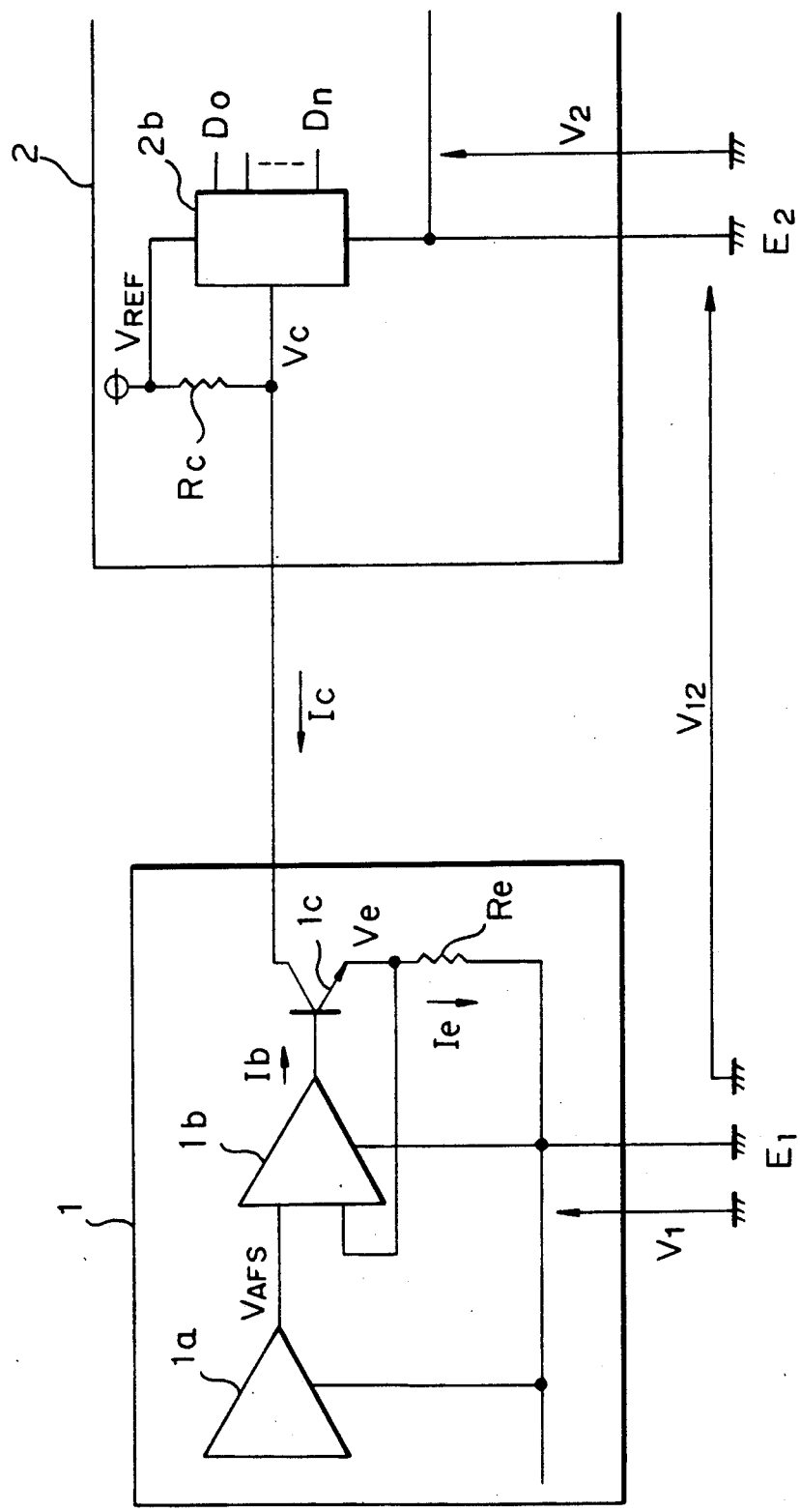
FIG. 3 is a circuit diagram of an apparatus for measuring an intake air flow of an internal combustion engine, showing one embodiment of the invention.

Referring first to FIG. 3, there is depicted a circuit diagram of an apparatus for measuring the air flow intake of an internal combustion engine in one embodiment of the present invention. The same components as those of the conventional apparatus illustrated in FIG. 1 are marked with like symbols as in FIG. 2, and the description is therefore concentrated on different components from the prior art apparatus.

In this embodiment, an air flow sensor 1 incorporates an operational amplifier 1$b$ for receiving at a non-inverting input terminal an output voltage $V_{AFS}$ of an amplifier 1$a$, a transistor 1$c$ and a resistor $R_e$. The operational amplifier 1$b$, transistor 1$c$ and resistor $R_e$ are combined to constitute a current source circuit. Connected between an input terminal $V_c$ and a reference power supply $V_{REF}$ of an A/D converter 2$b$ of a fuel injection control unit 2 is a resistor $R_c$, the connecting point of those is coupled to a collector of the transistor 1$c$.

The operational amplifier 1$b$ receives at a non-inverting input terminal (+) the output voltage $V_{AFS}$ of the amplifier 1$a$. An emitter of the transistor 1$c$ is fed back to an inverting terminal (−) of the operational amplifier, so that the emitter voltage is equalized to $V_{AFS}$. Let $I_b$, $I_e$ and $I_c$ be base, emitter and collector currents of the transistor 1$c$. Then, the formula $I_c = I_e - I_b$ is established. If a sufficiently large value is selected for a current amplification factor of the transistor, namely $I_b << I_e$, there will be valid a relation such as $I_c = I_e$.

Since there exists a relation such as $I_e = V_e/R_e = -V_{AFS}/R_e$, the following formula is obtained:

$$I_c = V_{AFS}/R_e$$

This formula implies that an electric current $I_c$ proportional to $V_{AFS}$ is obtained irrespective of a load connected to the collector of the transistor 1$c$. The electric current $I_c$ is supplied from voltage power supply $V_{REF}$ via the resistance $R_c$, and an input voltage $V_c$ of an A/D converter 2$b$ is therefore expressed by:

$$V_c = V_{REF} - I_c \cdot R_c$$

Substituting the preceding formula $I_c = V_{AFS}/R_e$ thereinto, $V_c$ is represented as follows:

$$V_c = V_{REF} - V_{AFS} \cdot (R_c/R_e)$$

When $R_c = R_e$, the input voltage is given by:

$$V_c = V_{REF} - V_{AFS}$$

Therefore, a value for $A_{AFS}$ is obtained by effecting an arithmetic operation such as:

$$V_{REF} - V_c = V_{REF} - (V_{REF} - V_{AFS}) = V_{AFS}$$

This arithmetic operation is performed by an unillustrated arithmetic unit while employing an A-D converted value of $V_c$.

As can be clarified from the description given above, $V_{AFS}$ is converted into the electric current $I_c$ and then sent out, as a result of which $V_{AFS}$ can be properly transmitted without being subjected to any influence even if there exists a potential increase $V_1$ at a reference point of the air flow sensor, a potential increase $V_2$ at a reference point of the fuel injection unit 2 and an inter ground potential $V_{12}$ between the ground points thereof.

Figure 4:
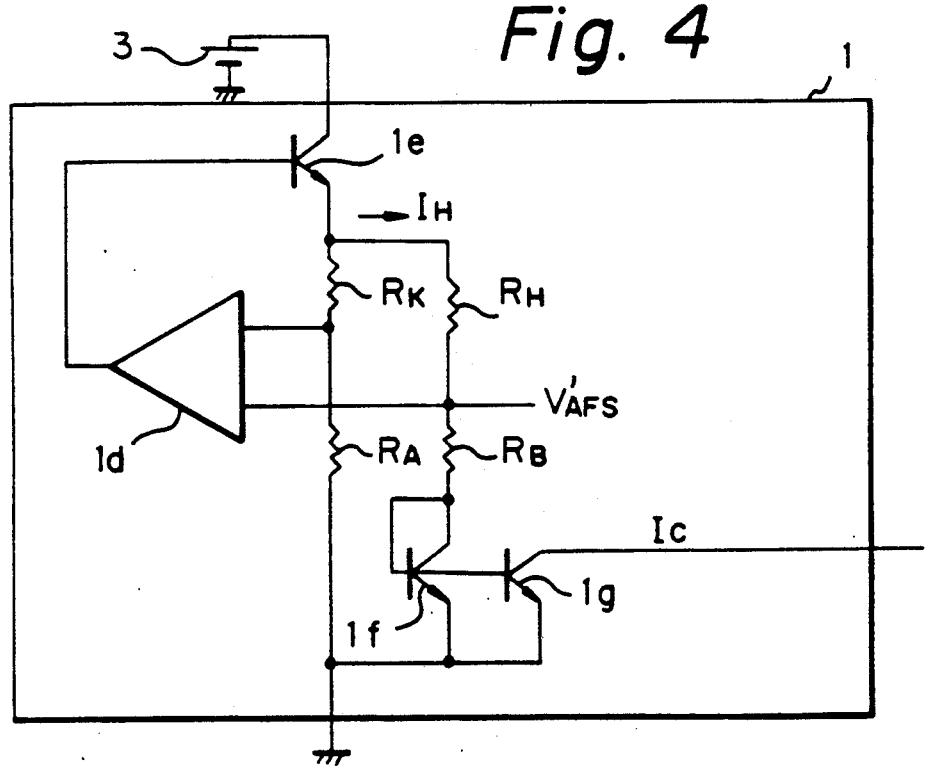
FIG. 4 is a circuit diagram showing another embodiment thereof.

FIG. 4 illustrates a circuit diagram relative to another embodiment which is applied to a hot wire type air flow sensor. In the drawing, symbols $R_H$, $R_K$, $R_A$, $R_B$, 1$d$ and 1$e$ designate the same components as shown in FIG. 1. Symbols 1$f$ and 1$g$ denote a pair of transistors constituting a current mirror circuit. In this second embodiment, it is characterized that a mirror circuit is added to a conventional hot wire type air flow sensor.

The transistors 1$f$ and 1$g$ are arranged to have the same parameters. A base of the transistor 1$f$ is connected to a collector thereof and a base of the transistor 1$g$. Since these two bases are set at the same voltage and the transistors have the same parameters, an emitter current $I_{eg}$ of the transistor 1$g$ and an emitter current $I_{ef}$ of the transistor 1$f$ are the same. The current $I_{ef}$ is represented such as $I_{eg} = I_H - I_{bg}$ (where $I_{bg}$ is a base current of the transistor), and a collector current $I_c$ of the transistor 1$g$ is represented such as $I_c = I_{eg} - I_{bg}$.

Consequently, $$I_H - I_{bg} = I_{ef} = I_{eg} = I_c + I_{bg}$$

From this formula, the current $I_c$ is represented as follows:

$$I_c = I_H - 2I_{bg}$$

If amplification factors of the transistors 1$f$ and 1$g$ are set to sufficiently large values, $I_{bg} << I_c$. Hence, there is established a relation such as $I_c = I_H$. Thus, the current $I_c$ equal to the current $I_H$ is obtained. The obtained current $I_c$ will be provided to a current/voltage converting circuit similar to that in the first embodiment shown in FIG. 3.

The foregoing embodiments have dealt with examples where the present invention is applied to the hot wire type air flow sensor. However, the present invention is, as a matter of course, applicable to all sensors ranging from a well-known type in which a potentiometer detects the degree of opening of a movable vane, which is determined by the level of air flow, to a type in which it is necessary to deal with an analog electric signal.

In accordance with the embodiment shown in FIG. 3, the amplifier 1$a$ is not necessarily provided but may be omitted. The current source circuit is not necessarily constructed by combining the operational amplifier with the transistor, but rather a variety of current source circuits are applicable.

In accordance with the embodiment shown in FIG. 4, the current mirror circuit is composed of bipolar transistors but may be composed of MOS transistors. The current mirror circuit can also be constructed by the transistor 1e and a transistor paired with this transistor 1e.

As discussed above, the present invention exhibits an excellent effect in which it is possible to invariably transmit an accurate air flow intake signal without undergoing any influence of fluctuations in potentials of the respective units, because the air flow sensor output is transmitted after being converted into a current signal.

Besides, the receiving circuit on the side of the fuel injection unit can fundamentally be composed of a single resistor piece and the current converting circuit of the air flow sensor is able to consist only of an extremely simple circuit. These arrangements are advantageous in terms of costs.

Although the illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What is claimed is:

1. An apparatus for measuring the level of an air flow intake of an internal combustion engine, comprising:
    a first means (1a) for outputting a voltage signal ($V_{AFS}$) corresponding to said level of said air flow intake of said internal combustion engine;
    a second means (1b, 1c and Re) for outputting a current (Ic) proportional to said voltage signal ($V_{AFS}$) output from said first means;
    first current-conducting means electrically connecting a voltage reference point of said first and second outputting means to a first point at a first ground potential;
    a third means (2b) for converting said current (Ic) output from said second means into an output voltage and for outputting the output voltage; and
    second current-conducting means electrically connecting a voltage reference point of said third means to a point at a second ground potential;
    so that said current and said output voltage from said third means are independent both of voltage drops across said first and second current-conducting means and also of a difference in said first and second ground potentials.

2. An apparatus according to claim 1, wherein said first means comprises a hot wire type air flow sensor.

3. An apparatus according to claim 1 or 2, wherein said third means comprises a resistor a first terminal of which is connected to a reference voltage power supply and a second terminal of which is capable of outputting said converted voltage output by said third means.

4. An apparatus according to claim 1 or 2, wherein said apparatus further comprises a fourth means for converting said output voltage from said third means into a digital signal.

5. An apparatus according to claim 3, wherein said apparatus further comprises a fourth means for converting said output voltage from said third means into a digital signal.

6. An apparatus for measuring the level of an air flow intake of an internal combustion engine, comprising:
    a circuit having multiple ground reference voltage potentials:
    a first means for outputting an electric signal corresponding to said level of said air flow intake of said internal combustion engine;
    a second means for outputting a current corresponding to said signal output from said first means; and
    a third means for converting said current output from said second means into a voltage and for outputting the voltage, said voltage being independent of fluctuations in ground reference voltage potentials;
    wherein said second means comprises an operational amplifier a first input terminal of which receives said signal output from said first means, a transistor a base terminal of which is connected to an output terminal of said operational amplifier and an emitter terminal of which is connected to a second input terminal of said operational amplifier, and a resistor connected to said emitter terminal of said transistor, whereby said current of said second means is obtained as a collector current of said transistor.

7. An apparatus for measuring the level of an air flow intake of an internal combustion engine, comprising:
    a circuit having multiple ground reference voltage potentials:
    a first means for outputting an electric signal corresponding to said level of said air flow intake of said internal combustion engine;
    a second means for outputting a current corresponding to said signal output from said first means; and
    a third means for converting said current output from said second means into a voltage and for outputting the voltage, said voltage being independent of fluctuations in ground reference voltage potentials; and
    wherein said second means comprises a current mirror circuit which is incorporated into a path following a current through a hot wire in said air flow sensor.

8. An apparatus according to claim 7, wherein said current mirror circuit comprises a first transistor and a second transistor, a collector terminal and a base terminal of said first transistor and a base terminal of said second transistor being connected to said output of said first means via a reference resistor, emitter terminals of said first and second transistors being connected to each other, and a collector current of said second transistor being provided as said current output by said second means.

9. An apparatus according to claim 8, wherein said transistors are bipolar transistors.

10. An apparatus according to claim 7, wherein said current mirror circuit is comprised of MOS transistors.

11. An apparatus for measuring the level of an air flow intake of an internal combustion engine, comprising:
    a first means for outputting an electric signal corresponding to said level of said air flow intake of said internal combustion engine;
    a second means for outputting a current corresponding to said signal output from said first means; and
    a third means for converting said current output from said second means into a voltage and for outputting the voltage, said voltage being independent of fluctuations in ground reference voltage potentials; and wherein said first means comprises a hot wire air flow sensor and said second means comprises an operational amplifier a first input terminal of which receives said signal output from said first means, a transistor a base terminal of which is connected to an output terminal of said operational amplifier and an emitter terminal of which is connected to a second input terminal of said operational amplifier, and a resistor connected to said emitter terminal of said transistor, whereby said current of said second means is obtained as a collector current of said transistor.

12. An apparatus according to claim 6, 7 or 11, wherein said third means comprises a resistor a first terminal of which is connected to a reference voltage power supply and a second terminal of which is capable of outputting said converted voltage output by said third means.

13. An apparatus according to claim 6, 7 or 11, wherein said apparatus further comprises a fourth means for converting said output voltage from said third means into a digital signal.

14. An apparatus according to claim 12, wherein said apparatus further comprises a fourth means for converting said output voltage from said third means into a digital signal.

* * * * *